Patented May 30, 1939

2,159,985

UNITED STATES PATENT OFFICE 2,159,985

BEER AND METHOD OF PREPARING SAME

Philip P. Gray, Forest Hills, and Irwin Stone, New York, N. Y., assignors to Wallerstein Company, Inc., New York, N. Y., a corporation of New York No Drawing. Application January 5, 1935, Serial No. 472

11 Claims. (Cl. 99—31)

This invention relates to the preparation of beer and ale and more particularly to the preparation of improved packaged beers and ales.

It is well known that gradual changes take place in the flavor, taste, color, brilliancy and other properties of beers and ales after bottling or other packaging, even when such beers and ales are properly prepared and packaged. Since considerable time may elapse before consumption, particularly in the case of packaged beers and ales, these changes or instability often seriously affect the product.

It is believed that these changes are caused, to a large extent, by oxidation reactions which take place in the beverage after packaging, the extent of change depending on such factors as time, temperature, exposure to light, the presence of catalysts and the like.

Containers, such as bottles, cans, barrels, etc. used in packaging, shipment, storage and merchandising of beers and ales are ordinarily not filled to 100% of capacity. In such containers there are ordinarily found head spaces, of varying capacity, above the surface of the packaged beverage. These head spaces are purposely left for convenience in filling, to allow for increased pressure during pasteurization and the like. The content of such a head space is made up almost entirely of air and carbon dioxide gas, the proportion of air depending on the method and manner of filling. In addition, there is ordinarily considerable air dissolved in the beverage. Part of this air in solution may come from the original air content of the head space; the remainder is ordinarily taken into solution, during production of the beverage, as a result of deliberate aeration, exposure to atmosphere or the like. In any event, some air is always present in the solution, the concentration of air being proportional to the partial pressure of the air in the bottle, and it is in equilibrium with the head space air.

It is believed that it is the presence of this air that results in the oxidation reactions above referred to.

The objectionable effects of these oxidation reactions are greatly accelerated by certain factors and may even be substantially immediate. For example, a few days of direct sunlight will have a pronounced effect. Again, it has been found that during pasteurization, beers and ales are particularly susceptible to the development of a deterioration of flavor, caused by oxidation accelerated by higher temperatures, which is evidenced by what is known as the "pasteurized taste". Even slight increases over normal pasteurizing temperatures or time periods often result, either immediately or subsequently, in so pronounced a taste as to render the product of inferior quality and at times even unsaleable.

Attempts have been made to remedy these conditions by removing the air but these attempts have not been entirely successful. It has been found too difficult to completely remove the head space air and practically impossible to remove the dissolved air.

It is an object of the present invention to provide improved beers and ales which will retain their original flavor, taste, color, brilliancy and other desirable properties and characteristics over relatively long periods of time, even when packaged in containers having head spaces holding substantial quantities of air.

It is a further object of the invention to provide improved beers and ales which will be highly resistant to the development, either immediate or gradual, of the so-called "pasteurized taste", in spite of minor variations from pasteurizing temperatures or time periods.

It is still a further object of the invention to provide improved beers and ales that are highly resistant to the deleterious effects of light.

More particularly, it is an object of the invention to provide improved beers and ales that are highly resistant to oxidation.

We have found that certain substances, when added even in small amounts to the beer or ale, prevent or retard to a high degree the reactions responsible for the changes above referred to. As a result, the original flavor, taste, appearance and other desirable characteristics of the beer or ale can be maintained over long periods of time, even though substantial amounts of air are present in the containers.

In the following description, beer alone is referred to for convenience but it is to be understood that the description applies equally to ales and other malt liquors. Also for convenience of description it is to be understood that the term "storage" period as used herein means the period prior to eventual opening of the bottles or other containers for consumption of the contents.

According to the process of the present invention, there is added to the beer at any suitable stage in the production, for example, before packaging, a material or materials capable, when so added, of effecting a substantial lowering of the oxidation-reduction potential of the beer without substantially effecting the wholesomeness, flavor, appearance or other desirable properties of the beer. Such material or materials, furthermore, should preferably be of such character that they can be added in relatively small quantities and are relatively stable, i. e., do not loose their original form too rapidly. In specifying addition of the added material before packaging, it is to be understood that this does not necessarily mean immediately before packaging since the desired results may be obtained by treatment prior to intermediate storage, for example, storage in tanks pending packaging.

As an example of such a material, we have found ascorbic acid to be satisfactory and advantageous. When relatively small quantities of ascorbic acid are added to the beer at any stage of the production prior to packaging, the packaged beer retains substantially its original flavor, taste, brilliancy and other desirable characteristics and properties over relatively long periods of time; is, if pasteurized, substantially free from "pasteurized taste"; and is highly stable under exposure to light and other unfavorable storage conditions.

We have found that in the course of storage of beer prepared as above described, the ascorbic acid content of the beer decreases with time, presumably as the result of its own oxidation. While the exact mechanism of the behavoir of the ascorbic acid is not definitely known, we believe that it acts in the beer in such a way as to lower the oxidation-reduction potential of the beer to the extent that substantially no oxidation of those normal constituents of beer which, if altered, would affect the flavor and colloidal stability of the beer, can take place until oxidation of the ascorbic acid has occurred.

In carrying out the invention to what is now considered the best advantage, therefore, the ascorbic acid is added in such quantities that a substantial amount thereof will remain in its original form, i. e., unoxidized, at the time of consumption following any normal storage period.

Theoretically, the amount of ascorbic acid to be added also depends, to some extent, on the amount of air present in the package, more ascorbic acid being theoretically indicated for larger amounts of air. Practically, however, this factor can be largely disregarded. Its relative effect under practical conditions is so minor that any amount of ascorbic acid sufficient to take care of the time element will be sufficient to take care of any variations in air content that are likely to be encountered. In fact, even a small amount of ascorbic acid is sufficient for a wide range of storage conditions and air content.

In other words, to carry out the invention effectively and economically, enough ascorbic acid should be added, with relation to the amount of air present in the package and the duration and other conditions of storage, that there will be some excess over the amount that will be normally oxidized as a result of the several factors mentioned. So far as we are now aware, there are no harmful or undesirable effects from the addition of any amounts of ascorbic acid, so that amounts over and above what is necessary to give the desired results are merely surplusage. Consequently, there appears to be no upper limit of the amount that can be added. Nor is there any absolute lower limit since even a very slight amount results in some degree of improvement, although the excess mentioned is necessary to give the best results. Such excess constitutes a reserve supply, so to speak, that will remain in its original form and so assure a stabilized beer up to the time of consumption since no undesirable changes take place in the beer as long as a substantial proportion of the ascorbic acid remains in its original form.

While the amounts of ascorbic acid that may be added in fulfillment of the conditions above referred to may vary widely, as above set forth, for bottled beer in normal containers the amount of ascorbic acid to be added to the beer may satisfactorily range from 25 to 100 milligrams per liter of beer. This gives an approximate equivalent of from 10 to 35 milligrams per 12 ounce bottle.

The following proportions have been found satisfactory and are cited by way of example: For 12-ounce bottles filled to a normal or average head space and with an air content in the head space of from 50% to 75% of such head space, measured at atmospheric pressure and at 25° C., ascorbic acid is added to the beer in such proportions as to give approximately 20 milligrams per bottle. With such a proportion we have found that after a storage period of three months, under average storage conditions, only about one-third of the original ascorbic acid content of the bottles had undergone change, the remaining two-thirds being present in its original form. Such a remainder demonstrates an ample stabilizing reserve against relatively long storage periods or otherwise unfavorable storage conditions.

A characteristic of ascorbic acid and other materials capable of being used in the same way is their common property of lowering the oxidation-reduction potential of the beer. This change can be observed by tests with suitable oxidation-reduction indicators. It is known that certain dyestuffs retain their original color when 100% oxidized and are decolorized when 100% reduced, the change being within a definite level of oxidation-reduction potentials for a given dyestuff. If, then, such a suitable dyestuff is added to a material under investigation, in such small quantities that the dyestuff itself has no substantial effect on the material, the relative amount of decolorization that results and the relative amount of time involved in such decolorization furnish a measure of the relative oxidation-reduction potential of the material in relation to the characteristic oxidation-reduction potential range of the particular dyestuff within which its reduction is known to occur.

An example of a suitable test indicator is dichlor-phenol-indo-phenol. We have found that if 0.25 cc. of a 0.2% solution of 2:6 dichlor-phenol-indo-phenol are placed in 10 cc. of a given untreated beer, the dyestuff is completely decolorized in from 180–240 seconds. If, however, the same test is made under the same conditions and on the same beer but with ascorbic acid added as above described, the dyestuff is decolorized practically instantaneously. This indicates a substantial lowering of the oxidation-reduction potential of the treated beer.

Other materials capable of similarly changing the oxidation-reduction potential of beers or ales and which are non-toxic and do not unfavorably affect the flavor, taste, appearance and other properties of the beer, may be used in addition to or in lieu of ascorbic acid. For example, the stereo-isomers of ascorbic acid and the analogues of ascorbic acid prepared from sugars having more or less than 6 carbon atoms may be used as above described. Other examples are reductone, at one time called glucic acid, and other so-called reductones. These represent a class of compounds that have marked reducing properties and are obtained from sugars by the action of alkali under suitable conditions. So-called reductinic acid and similar compounds derived from sugars may also be used.

These various materials are all characterized by their common property of effecting a substantial lowering of the oxidation-reduction potential of the beer to which they are added in small amounts, so that the treated beer decolorizes 2.6 dichlor-phenol-indo-phenol with great rapidity when tested as above described, as compared with the relatively slower decolorization by untreated beer.

It will be seen that the several materials referred to are further characterized in that they have, according to present chemical knowledge, the common structural group

namely, the en-diol group.

It will be recognized that many compounds other than those mentioned can be derived from sugars and similar bodies that would possess the reducing and other desired properties above referred to. Ascorbic acid, however, is now considered to effect the desired results most advantageously. Moreover, ascorbic acid has the additional advantage that it endows the beverage with many desirable nutritive and physiological properties characteristic of vitamin C.

What is claimed is:

1. In the art of producing beers and ales, the step which consists in adding ascorbic acid to the beer or ale in such amounts and under such conditions as to effect a substantial lowering of the oxidation-reduction potential of the beer or ale without substantially affecting the wholesomeness, flavor, appearance or other desirable characteristics of such beer or ale.

2. In the art of producing beers and ales, the step which consists in adding ascorbic acid to the beer or ale prior to the packaging thereof and in an amount between 25 and 100 mgilligrams per liter of beer or ale.

3. A beer or ale characterized by the presence therein of ascorbic acid in such amount as to effect substantial stabilizing of the beer or ale without substantially affecting the wholesomeness, flavor, appearance or other desirable characteristics of such beer or ale.

4. A beer or ale characterized by the presence therein of an analogue of ascorbic acid in such amount as to effect substantial stabilizing of the beer or ale without substantially affecting the wholesomeness, flavor, appearance or other desirable characteristics of such beer or ale.

5. In the art of producing beers and ales, the step which consists in adding an ascorbic acid to the beer or ale, in such amounts and under such conditions as to effect a substantial lowering of the oxidation-reduction potential of the beer or ale without substantially affecting the wholesomeness, flavor, appearance or other desirable characteristics of such beer or ale.

6. In the art of producing beers and ales, the step which consists in adding gluco-ascorbic acid to the beer or ale in such amounts and under such conditions as to effect a substantial lowering of the oxidation-reduction potential of the beer or ale without substantially affecting the wholesomeness, flavor, appearance or other desirable characteristics of such beer or ale.

7. In the art of producing beers and ales, the step which consists in adding an analogue of ascorbic acid to the beer or ale in such amounts and under such conditions as to effect a substantial lowering of the oxidation-reduction potential of the beer or ale without substantially affecting the wholesomeness, flavor, appearance or other desirable characteristics of such beer or ale.

8. In the art of producing beers and ales, the step which consists in adding to the beer or ale a compound selected from the group consisting of ascorbic acid, stereo-isomers and analogues thereof, reductinic acid and reductones, in such amounts and under such conditions as to effect a substantial lowering of the oxidation-reduction potential of the beer or ale without substantially affecting the wholesomeness, flavor, appearance or other desirable characteristics of such beer or ale.

9. A beer or ale characterized by the presence therein of an ascorbic acid in such amount as to effect substantial stabilizing of the beer or ale without substantially affecting the wholesomeness, flavor, appearance or other desirable characteristics of such beer or ale.

10. A beer or ale characterized by the presence therein of gluco-ascorbic acid in such amount as to effect substantial stabilizing of the beer or ale without substantially affecting the wholesomeness, flavor, appearance or other desirable characteristics of such beer or ale.

11. A beer or ale characterized by the presence therein of a compound selected from the group consisting of ascorbic acid, stereo-isomers and analogues thereof, reductinic acid and reductones in such amount as to effect substantial stabilizing of the beer or ale without substantially affecting the wholesomeness, flavor, appearance or other desirable characteristics of such beer or ale.

PHILIP P. GRAY.
IRWIN STONE.